United States Patent
Yu et al.

(10) Patent No.: US 6,882,380 B2
(45) Date of Patent: Apr. 19, 2005

(54) LIQUID CRYSTAL DISPLAY

(75) Inventors: Chuan-Pei Yu, I-Lan Hsien (TW); Han-Chou Liu, Hsin-Chu (TW); Chin-Kun Hsieh, Hsin-Chu (TW); Chien-Hung Kuo, Tai-Chung Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 46 days.

(21) Appl. No.: 10/605,014

(22) Filed: Sep. 1, 2003

(65) Prior Publication Data

US 2004/0246402 A1 Dec. 9, 2004

(30) Foreign Application Priority Data

Jun. 3, 2003 (TW) ........................................ 92114982 A

(51) Int. Cl.⁷ .......................................... G02F 1/1335
(52) U.S. Cl. ............................ 349/61; 349/62; 349/64; 349/65; 349/70; 349/74
(58) Field of Search ............................. 349/61, 65, 74, 349/70, 62, 64

(56) References Cited

U.S. PATENT DOCUMENTS 6,144,424 A * 11/2000 Okuda et al. ................. 349/65
6,741,301 B1 * 5/2004 Tsuji ........................... 349/58

FOREIGN PATENT DOCUMENTS

| JP | 2002244133 | 8/2002 |
| TW | 552439 | 9/2003 |

* cited by examiner

*Primary Examiner*—Kenneth Parker
*Assistant Examiner*—Thanh-Nhan P Nguyen
(74) *Attorney, Agent, or Firm*—Winston Hsu

(57) ABSTRACT

A liquid crystal display includes a first panel positioned on a front surface of a backlight unit, and a second panel positioned on a back surface of the backlight unit. The backlight unit provides lights to both of the first panel and the second panel, thus enabling either of the panels to display images.

13 Claims, 4 Drawing Sheets

LIQUID CRYSTAL DISPLAY

BACKGROUND OF INVENTION

1. Field of the Invention

The present invention relates to a liquid crystal display, and more particularly, to a liquid crystal display with a backlight unit capable of emitting light from both of its front surface and back surface, so as to display images on both of a front panel and a back panel of the liquid crystal display.

2. Description of the Prior Art

Liquid crystal displays (LCDs) are widely used in digital cameras, PDAs, vehicle satellite navigation systems, computer monitors, flat panel TVs and so on. The LCDs are composed of two transparent glass substrates with a liquid crystal layer positioned between the two glass substrates. Since the LCDs cannot emit light by themselves, a backlight unit is required to be installed at the backside of the LCD to provide light source for displaying images.

The backlight unit uses a light guide plate to guide light emitted from a self-emitting light source (such as fluorescent lamps or light emitting diodes) to the elements such as a reflector and a diffusion sheet to brighten the light and generate a uniform plane light source. Sometimes, in order to make the light has special optical characteristics, an optical film is installed in the backlight unit, for example a prism sheet is often installed on the diffusion sheet to focus the light and increase the brightness on the front surface of the backlight. In addition, special patterns are also formed on the light guide plate to adjust the light according to product demands.

Since the quality of the backlight unit will no doubt affect the display quality of the LCD, and the backlight unit occupies a very high percentage of production cost or power consumption of the entire LCD, it is very important to reduce the production cost and the power consumption of the backlight unit in development of the LCD application.

SUMMARY OF INVENTION

It is an object of the claimed invention to provide a liquid crystal display with a backlight unit capable of emitting lights from both of its front surface and back surface, so as to display images on both of a front panel and a back panel of the liquid crystal display using the same backlight unit to reduce the amounts of backlight units and the costs thereof.

It is another object of the claimed invention to provide a liquid crystal display with a backlight unit capable of emitting lights from both of its front surface and back surface, so as to display images on both of a front panel and a back panel of the liquid crystal display to increase visible angles thereof and thus make the liquid crystal display suitable for displaying images in public or at special occasions.

According to the claimed invention, theliquid crystal display has a first panel positioned on a front surface of a backlight unit, and a second panel positioned on a back surface of the backlight unit. The backlight unit provides lights to both of the first panel and the second panel to enable either of the panels to display images.

It is an advantage of the present invention that the liquid crystal display has two panels positioned on the front surface and the back surface of the backlight unit, respectively, thus the two panels can use the same backlight unit to provide light for displaying images. In the case, it is not necessary to install two backlight units for providing light to the two panels, respectively, so as to reduce the costs and power consumption spent on the backlight unit. In addition, the liquid crystal display of the present invention is capable of displaying images on both of the front panel and the back panel, therefore being suitable for the public or special display occasions. Furthermore, the liquid crystal display of the present invention is also capable of transmitting different signals to the front panel and the back panel to make the front panel and the back panel display different images, so as to improve the utility of the liquid crystal display and the backlight unit thereof.

These and other objects of the claimed invention will be apparent to those of ordinary skill in the art after reading the following detailed description of the preferred embodiment that is illustrated in the various figures and drawings.

DETAILED DESCRIPTION

Figure 1:
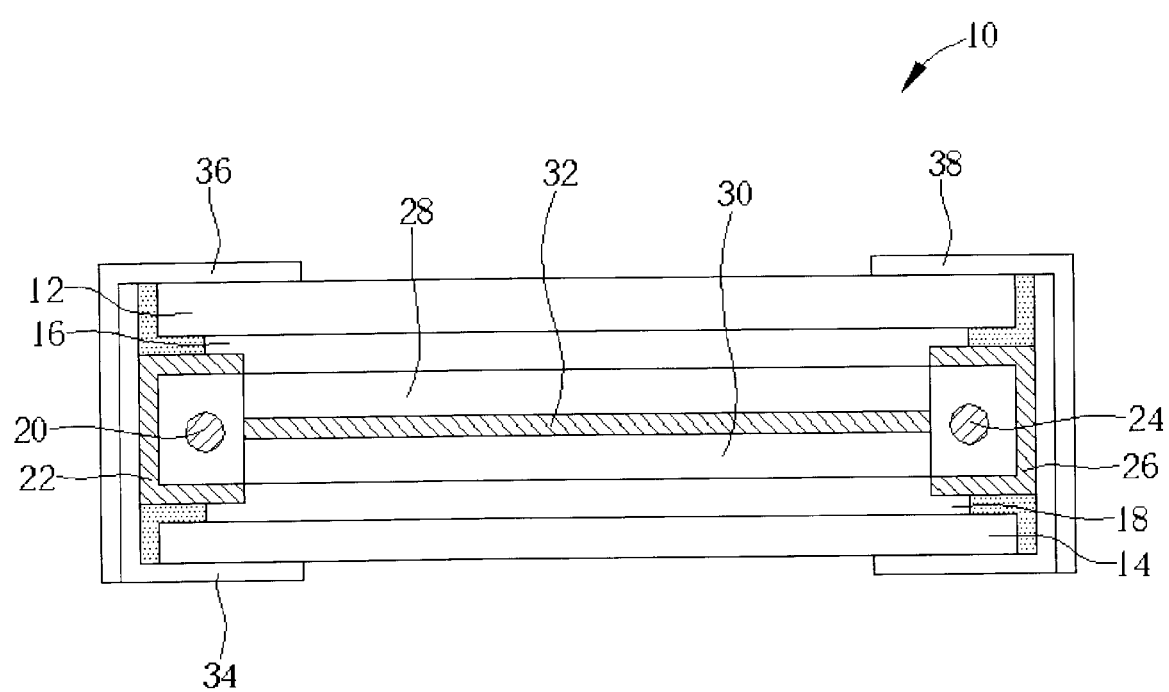
FIG. 1 is a cross-sectional diagram of a liquid crystal display according to the present invention.

Referring to FIG. 1, FIG. 1 is a cross-sectional diagram of a liquid crystal display according to the present invention. As shown in FIG. 1, a liquid crystal display 10 has two parallel panels 12 and 14 positioned on a front surface of a backlight unit and on a back surface of the backlight unit, respectively. The liquid crystal display 10 further has two frames 36 and 38 positioned on the left side and the right side of the backlight unit to fix to another frame 34, so as to support all the elements of the liquid crystal display 10. The backlight unit has an optical film 16 positioned on a back surface of the panel 12, an optical film 18 positioned on a back surface of the panel 14, and two stacked light guide plates 28, 30 positioned between the optical film 16 and the optical film 18 for guiding light emitted from the edge light sources 20, 24 to the panels 12 and 14.

According to a better embodiment of the present invention, the amounts of the light sources 20 and 24 can be changed depending on the brightness demands. All kinds of the known light sources can be used as the light sources 20 and 24, such as fluorescent lamps and light emitted diodes. For more uniformly distributing the light of the backlight unit, a diffusion sheet (not shown) is positioned on the light guide plate 28, the light guide plate 30 or both of the light guide plates 28 and 30, and sometimes, the light guide plates 28 and 30 further have patterns (not shown) thereon to improve the light distribution. The patterns on the light guide plates 28 and 30 are optical structures for destroying total reflection of light, such as printing dots, non-printing dots and grooves.

In addition, two lamp reflectors 22 and 26 are used to surround the light sources 20 and 24, respectively, and a reflector 32 is also positioned between the light guide plates 28 and 30, so as to increase the light utility. However, the present invention is not limited to the structure mentioned above, other similar elements for reflecting the light to the light guide plates 28 and 30, and design choices of the amounts, shapes or positions of the reflector 32 and the lamp reflectors 22, 26 can also be applied in the liquid crystal display of the present invention.

Figure 2:
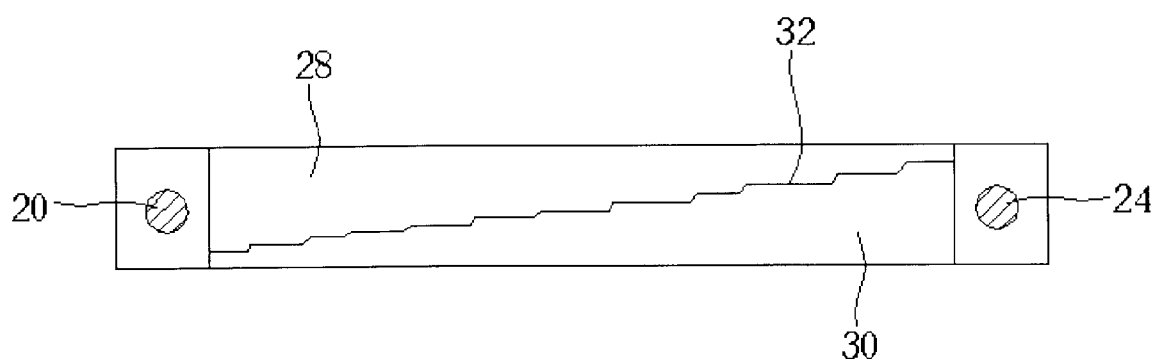
FIG. 2 is a schematic diagram of a backlight unit of a liquid crystal display according to the present invention.

Referring to FIG. 2 of a schematic diagram of a backlight unit of a liquid crystal display according to the present invention, the light guide plates 28 and 30 can also be formed in the shapes of two stacked wedges or triangles instead of two stacked rectangles as shown in FIG. 1.

Figure 3:
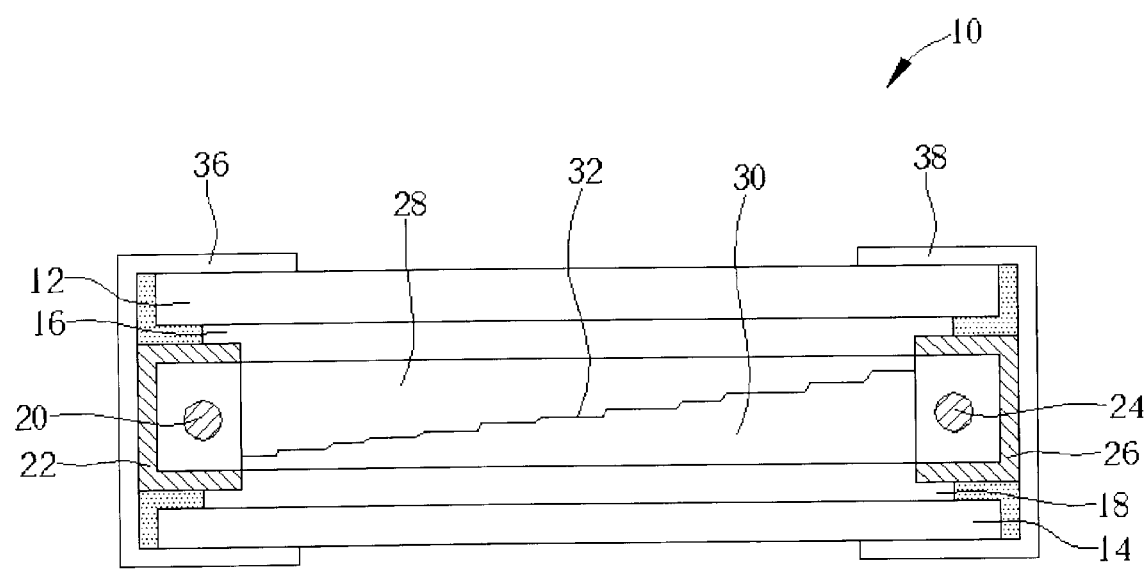
FIG. 3 is a cross-sectional diagram of a liquid crystal display according to a second embodiment of the present invention.

Referring to FIG. 3, FIG. 3 is a cross-sectional diagram of a liquid crystal display according to a second embodiment of the present invention. The liquid crystal display 10 uses the left frame 36 and the right frame 38 to fix all the elements thereof in this embodiment. Since the bottom frame 34 shown in FIG. 1 is omitted from the backlight unit of the present embodiment, the fabricating process of the liquid crystal display 10 can be simplified, and the weight, the volume of the liquid crystal display 10 can also be reduced.

Figure 4:
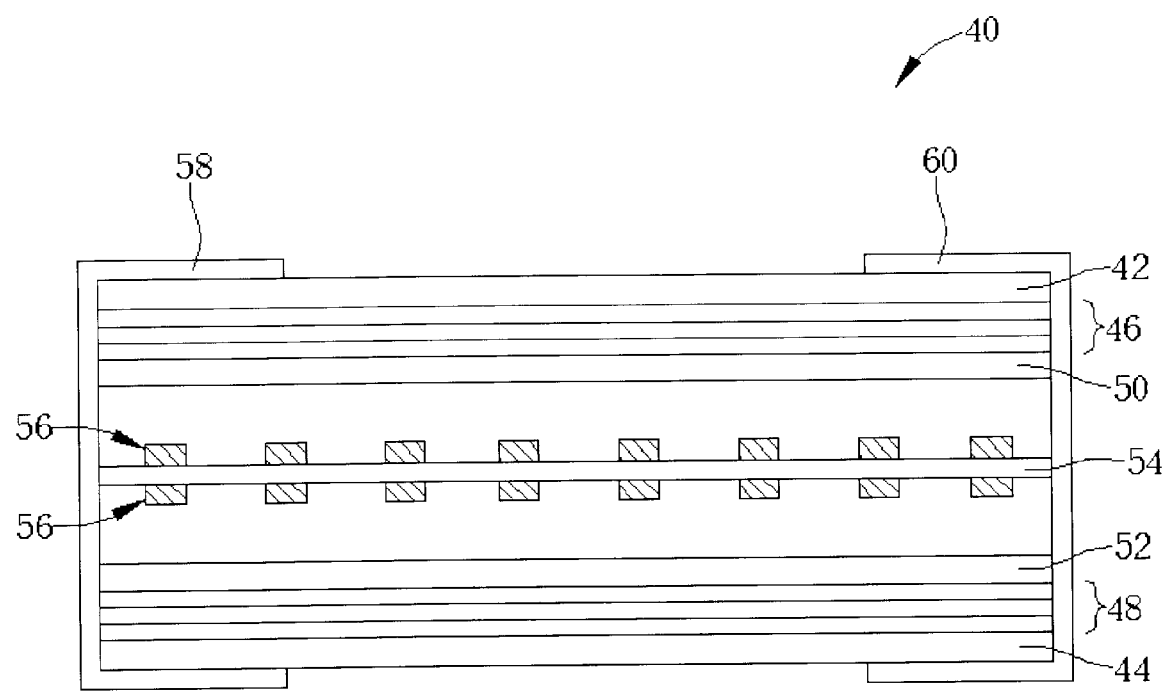
FIG. 4 is a cross-sectional diagram of a liquid crystal display according to a third embodiment of the present invention.

The light sources of the liquid crystal display can be positioned either at the edges of the backlight unit or at the central part within the backlight unit according to the present invention. Referring to FIG. 4, FIG. 4 is a cross-sectional diagram of a liquid crystal display according to a third embodiment of the present invention. As shown in FIG. 4, a liquid crystal display 40 has two parallel panels 42 and 44 positioned on a front surface of a backlight unit and on a back surface of the backlight unit, respectively. An optical film 46 and a diffusion sheet 50 are positioned on a back surface of the panel 42, an optical film 48 and a diffusion sheet 52 are positioned on a back surface of the panel 44, and a light source 56 is positioned between the diffusion sheet 50 and the diffusion sheet 52 to use the diffusion sheets 50, 52 to uniformly transmit light to the panels 42, 44. In addition, the liquid crystal display 40 further has two frames 58 and 60 positioned on the left side and the right side of the backlight unit to fix all the elements of the liquid crystal display 40.

Each of the optical films 46 and 48 includes at least a diffuser sheet and a prism sheet. The light source 56 includes a plurality of light emitting diodes arranged on a first surface of a printed circuit board 54 to face the panel 42, and a plurality of light emitting diodes arranged on a second surface of the printed circuit board 54 to face the panel 44. The amounts of the light emitting diodes can be adjusted depending on the brightness demands. In addition, according to the other embodiments of the present invention, the light source 56 can also be composed of a plurality of fluorescent lamps, the fluorescent lamps being uniformly distributed in the space between the panels 42 and 44 to emit light to the panels 42 and 44.

In contrast to the prior art, the liquid crystal display of the present invention has two panels positioned on the front surface and the back surface of the backlight unit, respectively, thus the two panels can use the same backlight unit to provide light for displaying images. In the case, it is not necessary to install two backlight units for providing light to the two panels, respectively, thus effectively reducing the costs and power consumption spent on the backlight unit. In addition, the liquid crystal display of the present invention is capable of displaying images on both of the front panel and the back panel, therefore being suitable for people at different positions, especially for people in the public or at special display occasions, to watch the display. Furthermore, the liquid crystal display of the present invention is also capable of transmitting different signals to the front panel and the back panel to make the front panel and the back panel display different images, so as to improve the utility of the liquid crystal display and the backlight unit thereof.

Those skilled in the art will readily observe that numerous modifications and alterations of thedevice may be made while retaining the teachings of the invention. Accordingly, the above disclosure should be construed as limited only by the metes and bounds of the appended claims.

What is claimed is:

1. A liquid crystal display comprising a first panel positioned on a front surface of a backlight unit, and a second panel positioned on a back surface of the backlight unit; wherein the backlight unit provides light to both of the first panel and the second panel to enable either of the panels to display images, the backlight unit comprising:
   a first light guide plate positioned on a back surface of the first panel;
   a second light guide plate positioned on a back surface of the second panel;
   at least a light source and a first lamp reflector surrounding the first light source positioned at a first side of the backlight unit, and at least a second light source and a second lamp reflector surrounding the second light source positioned at a second side of the backlight unit; and
   a reflector positioned between the first side and the second side to reflect light emitted from the first light source and the second light source to the first panel and the second panel.

2. The liquid crystal display of claim 1 wherein the first light source and the second light source comprise fluorescent lamps.

3. The liquid crystal display of claim 1 wherein the first light source and the second light source comprise light emitting diodes.

4. The liquid crystal display of claim 1 wherein the first light guide plate comprises patterns for destroying total reflection of light.

5. The liquid crystal display of claim 4 wherein the patterns comprise printing dots, non-printing dots and grooves.

6. The liquid crystal display of claim 1 wherein the second light guide plate comprises patterns for destroying total reflection of light.

7. The liquid crystal display of claim 6 wherein the patterns comprise printing dots, non-printing dots and grooves.

8. The liquid crystal display of claim 1 wherein the first panel and the second panel display the same images.

9. The liquid crystal display of claim 1 wherein the first panel and the second panel display different images.

10. A liquid crystal display comprising a first panel positioned on a front surface of a backlight unit, and a second panel positioned on a back surface of the backlight unit; wherein the backlight unit provides light to both of the first panel and the second panel to enable either of the panels to display images, the backlight unit comprising:
    a first optical film and a first diffusion sheet positioned on a back surface of the first panel;
    a second optical film and a second diffusion sheet positioned on a back surface of the second panel; and
    at least a light source positioned between the first diffusion sheet and the second diffusion sheet, and light emitted from the light source passing through the first diffusion sheet and the second diffusion sheet to be uniformly transmitted to the first panel, and the second panel.

11. The liquid crystal display of claim 10 wherein the light source comprises a plurality of light emitting diodes positioned on a first surface of a printed circuit board to face the first panel, and a plurality of light emitting diodes positioned on a second surface of the printed circuit board to face the second panel.

12. The liquid crystal display of claim 10 wherein the light source comprises a plurality of fluorescent lamps.

13. The liquid crystal display of claim 10 wherein the first optical film and the second optical. film comprise at least a diffuser sheet and a prism sheet.

* * * * *